Sept. 5, 1972  KANESHIGE NINOMIYA  3,689,341
METHOD OF SPLICING RUBBER CONVEYER BELTS EACH
HAVING A STEEL CORD EMBEDDED THEREIN
Filed Dec. 3, 1970   3 Sheets-Sheet 1
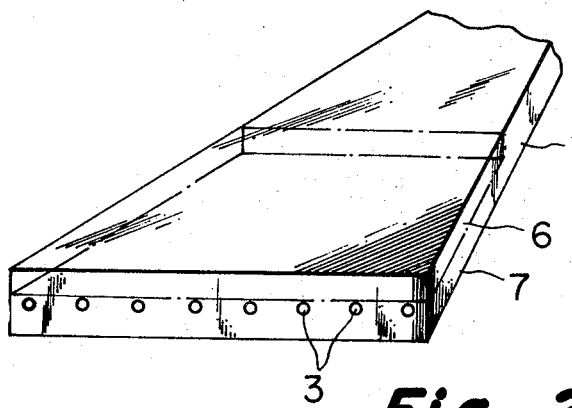
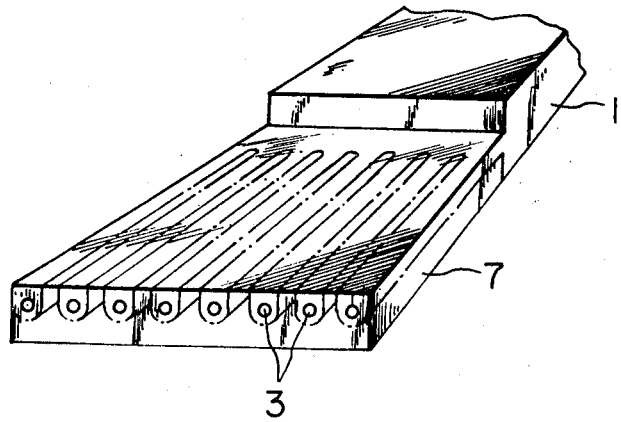
INVENTOR
KANESHIGE NINOMIYA
ATTORNEYS United States Patent Office 3,689,341
Patented Sept. 5, 1972

3,689,341
METHOD OF SPLICING RUBBER CONVEYER
BELTS EACH HAVING A STEEL CORD
EMBEDDED THEREIN
Kaneshige Ninomiya, Yokohama, Japan, assignor to
Bridgestone Tire Company Limited, Tokyo, Japan
Filed Dec. 3, 1970, Ser. No. 94,918
Claims priority, application Japan, Dec. 9, 1969,
44/98,515
Int. Cl. B31f 5/00
U.S. Cl. 156—159
1 Claim

ABSTRACT OF THE DISCLOSURE

A method of splicing rubber conveyer belts each having a steel cord embedded therein comprising the steps of cutting out of one end to be spliced of a rubber conveyer belt comb-teeth shaped projections each having a steel cord embedded therein and whose top surface is flat and bottom surface is convex in cross section, cutting out of another end of the rubber conveyer belt a base plate having a reduced thickness provided between successive steel cords with grooves formed complementally with the comb-teeth shaped projections at one end of the rubber conveyer belt and whose bottom surface is concave in cross section, bringing the comb-teeth shaped projections into engagement with the grooves, and filling up gaps formed between respective ends of the belt with new rubber cover to form a flat and continuous spliced surface. The comb-teeth shaped projections and grooves are cut out of respective end of the belt with the aid of an electrically heating cutter having a U-shaped knife blade adapted to be heated at about 800° C. during its use.

---

The present invention relates to a method of splicing rubber conveyer belts each having a core embedded therein and consisting of a plurality of steel cords extending lengthwise direction of the belt and arranged side by side and separated apart one from the other. The method is effectively applicable to the fabrication of a long rubber conveyer belt, an endless rubber conveyer belt, etc.

Heretofore it has been proposed to splice rubber conveyer belts of the kind above referred to by cutting out of the ends to be spliced of a rubber conveyer belt comb-teeth shaped projections each having a steel cord embedded therein and which are square in cross section with the aid of a cutter having a flat knife blade, bringing the comb-teeth shaped projections thus formed into engagement each other in interdigital relation, covering spliced parts thus formed with new rubber cover vulcanized or not vulcanized, and finally vulcanizing the assembly or making the covered rubber integral with the remainder of the rubber belt.

The conventional method as mentioned above has the disadvantage that the comb-teeth shaped projections are not uniformly spaced apart one from the other so that there is risk of the steel cords being bent and hence exposed out of the rubber cover in case of bringing the comb-teeth shaped projections formed at each end of the rubber belt into engagement with those formed at another end thereof, and that it becomes more difficult to align all of the comb-teeth shaped projections with the same plane thus requiring considerable skillfulness and taking much time for the splicing work.

In the above mentioned conventional method use has been made of a cutter having a flat knife blade for the purpose of cutting out the comb-teeth shaped projections. Each of these comb-teeth shaped projections results in square in cross section and has sharp edged corners. The presence of the sharp edged corners of the comb-teeth shaped projections prevents the spliced parts formed between the ends of the belt from being filled up with new rubber cover in an amount sufficient to provide a flat and continuous spliced surface in case of making the assembly integral unit by vulcanization. Moreover, the conventional method has the considerable disadvantage that there is tendency for the rubber conveyer belt at the spliced parts to produce blisters, pinholes or sponge-like spots with the result that the rubber conveyer belt is liable to be broken after short use.

An object of the invention is to provide a novel method of the kind above referred to whereby the above mentioned disadvantage can be completely obviated.

For realization of the above object, the method according to the invention comprises the steps of cutting out of one end to be spliced of a rubber conveyer belt comb-teeth shaped projections each having a steel cord embedded therein and whose top surface is flat and bottom surface is convex in cross section; cutting out of another end of the rubber conveyer belt a base plate having a reduced thickness provided between successive steel cords with grooves formed complementally with the comb-teeth shaped projections at one end of the rubber conveyer belt and whose bottom surface is concave in cross section; bringing the comb-teeth shaped projections into engagement with the grooves; and filling up gaps formed between respective ends of the belt with new rubber cover to form a flat and continuous spliced surface.

The invention has another feature that the comb-teeth shaped projections and grooves are cut out of respective end of the rubber conveyer belt with the aid of an electrically heating cutter having a U-shaped knife blade adapted to be heated at about 800° C. during its use.

Other objects and features of the invention will appear in the following specification, reference being had to the drawings, in which:

FIGS. 1 and 2 are perspective views of one end of a rubber conveyer belt illustrating two successive steps of cutting out of one end of a rubber conveyer belt comb-shaped projections each having a steel cord embedded therein by the method according to the invention;

Figure 3:
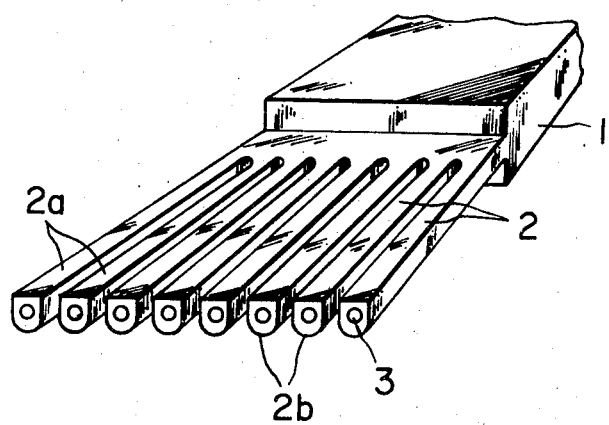
FIG. 3 is a perspective view of comb-teeth shaped projections obtained by the steps shown in FIGS. 1 and 2.
Figure 4:
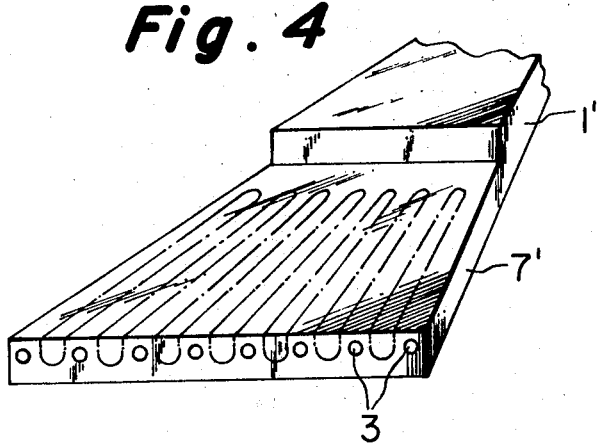
FIG. 4 is a perspective view similar to FIG. 2 but showing another step of cutting out of another end of the rubber conveyer belt a base plate having a reduced thickness and provided at its top surface with grooves formed complementally with the comb-teeth shaped projections shown in FIG. 3.
Figure 5:
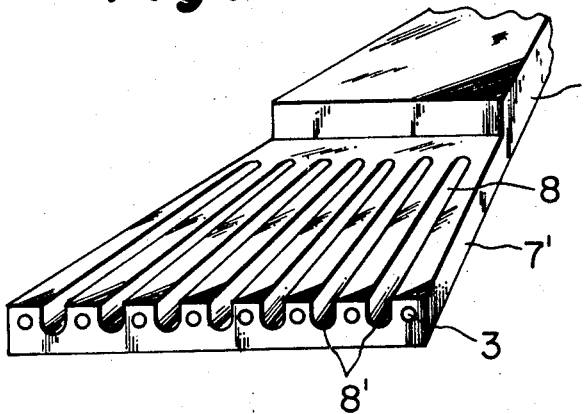
FIG. 5 is a perspective view of the base plate obtained by the step shown in FIG. 4.

In accordance with the invention, in order to obviate the above mentioned disadvantage encountered with the conventional method, at the first place the upper rubber cover 6 at one end 1 of the rubber conveyor belt is cut out through dot-dash lines as shown in FIG. 1 to form a base plate 7 having a reduced thickness. Secondly, the base plate 7 is cut through those portions which surround the steel cords 3 as shown by dot-dash lines in FIG. 2. Then, the remainder of the base plate 7 is removed to obtain comb-teeth shaped projections 2 whose top surface 2a is flat and bottom surface 2b is convex in cross section as shown in FIG. 3. Third, another base plate 7' is formed at another end 1' of the rubber conveyer belt by cutting out the upper rubber cover in the same manner as in the above mentioned first step shown in FIG. 1. Fourth, this base plate 7' is cut out through dot-dash lines as shown in FIG. 4 to form grooves 8 whose bottom surface 8' is concave in cross section as shown in FIG. 5. These grooves 8 are located between successive steel cords 3 and hence formed complementally with the comb-teeth shaped projections 2 shown in FIG. 3. Fifth, the comb-teeth shaped projections 2 shown in FIG. 3 are brought into engagement with the grooves 8 shown in FIG. 5. Finally, new rubber cover is filled in gaps formed between the respective ends 1 and 1' of the rubber conveyer belt and the assembly is subjected to vulcanization to make the covered rubber integral with the remainder of the rubber belt to form a flat and continuous spliced surface.

Figure 6:
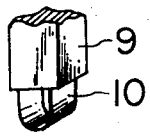
FIG. 6 is a perspective view of essential parts of an electrically heating cutter having a U-shaped knife blade and adapted for use in the method according to the invention.

The invention makes use of an electrically heating cutter as shown in FIG. 6. The cutter is provided at the end of its handle 9 with a U-shaped knife blade 10 which is adapted to be heated at about 800° C. during its use by means of an electric heater (not shown) enclosed in the handle 9.

The U-shaped knife blade 10 is detachably mounted to the handle 9 so as to selectively use any U-shaped knife blade whose dimension is well matched to the comb-teeth shaped projections 2 and grooves 8 having any desired size.

As explained hereinbefore, the invention provides the comb-teeth shaped projections 2 each having a steel cord 3 embedded therein and whose top surface 2a is flat and bottom surface 2b is convex in cross section at one end 1 of the rubber conveyer belt and grooves 8 formed complementally with the comb-teeth shaped projections 2 and whose bottom surface 8' is concave in cross section at another end 1' of the belt so that the comb-teeth shaped projections 2 can be snugly fitted into the grooves 8, the base plate 7' serving as the support thus enabling the splicing work in a positive manner.

Thus, the invention makes it possible to provide a smooth and continuous spliced surface which permits of filling up the spliced parts formed between the ends 1, 1' of the belt to be spliced with new rubber cover in an amount sufficient to make the spliced parts integral with the remainder of the belt by vulcanization. The invention further provides the important advantage that there is no tendency for the rubber conveyer belt at the splicing part to produce blisters, pinholes or sponge-like spots whereby to increase the effective life of the belt.

The use of the electrically heating cutter having a U-shaped knife blade 10 in accordance with the invention is capable of obtaining comb-teeth shaped projections each having a steel cord embedded therein and whose top surface is flat and bottom surface is convex in cross section on the one hand and grooves formed complementally with the comb-teeth shaped projections and whose bottom surface is concave in cross section on the other hand in an easy and speedy manner.

Thus, the invention provides an economical way of splicing opposed ends of a rubber conveyor belt, and can be applied effectively to the fabrication of a long rubber conveyer belt, an endless rubber conveyer belt, etc.

The description and example given above are intended to illustrate the best mode of performing the invention. It is apparent that many modifications thereof may occur to those skilled in the art, which will fall within the scope of the following claim.

What is claimed is:

1. A method of splicing rubber conveyer belts each having a core embedded therein and consisting of a plurality of steel cords extending lengthwise direction of the belt and arranged side by side and separated apart one from the other, comprising the steps of cutting out of one end to be spliced of a rubber conveyer belt comb-teeth shaped projections each having a steel cord embedded therein and whose top surface is flat and bottom surface is convex in cross section, cutting out of another end of the rubber conveyer belt a base plate having a reduced thickness provided between successive steel cords with grooves formed complementally with the comb-teeth shaped projections at one end of the rubber conveyer belt and whose bottom surface is concave in cross section, bringing the comb-teeth shaped projections into engagement with the grooves, and filling up gaps formed between respective ends of the belt with new rubber cover to form a flat and continuous spliced surface.

References Cited

UNITED STATES PATENTS

| | | | |
|---|---|---|---|
| 1,735,686 | 11/1929 | Kimmich | 156—502 |
| 2,733,181 | 1/1956 | Riedesel | 156—159 |
| 3,101,290 | 8/1963 | Paul | 156—159 |
| 3,304,215 | 2/1967 | Paul | 156—304 |
| 3,487,871 | 1/1970 | Kanamori | 156—304 |

DOUGLAS J. DRUMMOND, Primary Examiner

U.S. Cl. X.R.

156—304